(12) United States Patent
Frey et al.

(10) Patent No.: US 9,369,296 B2
(45) Date of Patent: Jun. 14, 2016

(54) FABRIC CHIP HAVING TRUNKED LINKS

(75) Inventors: Michael G. Frey, Granite Bay, CA (US); Vincent E. Cavanna, Loomis, CA (US); Trevor Joseph Switkowski, Lincoln, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 140 days.

(21) Appl. No.: 14/124,817

(22) PCT Filed: Aug. 8, 2011

(86) PCT No.: PCT/US2011/046948
§ 371 (c)(1),
(2), (4) Date: Dec. 9, 2013

(87) PCT Pub. No.: WO2013/022427
PCT Pub. Date: Feb. 14, 2013

(65) Prior Publication Data
US 2014/0112125 A1  Apr. 24, 2014

(51) Int. Cl.
*H04L 12/18*  (2006.01)
*H04Q 3/00*  (2006.01)
*H04L 12/933*  (2013.01)
*H04L 12/931*  (2013.01)
*H04L 12/24*  (2006.01)

(52) U.S. Cl.
CPC ........ *H04L 12/1886* (2013.01); *H04L 41/0668* (2013.01); *H04L 49/101* (2013.01); *H04L 49/109* (2013.01); *H04L 49/201* (2013.01); *H04Q 3/0004* (2013.01)

(58) Field of Classification Search
None
See application file for complete search history.

(56) References Cited

U.S. PATENT DOCUMENTS 6,016,310 A * 1/2000 Muller et al. .................. 370/255
6,363,077 B1 * 3/2002 Wong et al. .................... 370/422
(Continued)

FOREIGN PATENT DOCUMENTS

CN  101741711 A  6/2010
WO  WO-02/15496 A1  2/2002

OTHER PUBLICATIONS

Cisco Nexus 7000 Series NX-OS High Availability and Redundancy Guide: Overview [online], Jul. 27, 2009, Retrieved from the Internet <URL: http://cisco.biz/en/US/docs/switches/datacenter/sw/4_1/nx-os/high_availability/configuration/guide/ha_overview.html#wp1084090> [retrieved on Aug. 3, 2011].
(Continued)

*Primary Examiner* — Ayaz Sheikh
*Assistant Examiner* — Peter Chau
(74) *Attorney, Agent, or Firm* — Mannava & Kang, P.C.

(57) ABSTRACT

A fabric chip includes a plurality of port interfaces, in which each of the plurality of port interfaces includes a network chip interface (NCI) block having a port resolution module to determine which of the port interfaces is to receive a packet from the NCI block and a crossbar block communicatively coupled with each of the NCI blocks in the plurality of port interfaces. In addition, at least two of the plurality of port interfaces are to be connected to at least two port interfaces of another fabric chip as trunked links of a trunk. Moreover, the NCI blocks of the at least two of the plurality of port interfaces include a resource that keeps track of the port interfaces in the fabric chip that are connected to the trunk links of the trunk.

10 Claims, 6 Drawing Sheets

(56) References Cited

U.S. PATENT DOCUMENTS

| | | | |
|---|---|---|---|
| 6,819,654 B2 | 11/2004 | Soloway et al. | |
| 7,251,217 B2 | 7/2007 | Wong et al. | |
| 7,317,722 B2 | 1/2008 | Aquino et al. | |
| 7,519,054 B2 | 4/2009 | Varma | |
| 7,570,654 B2 | 8/2009 | Muthukrishnan et al. | |
| 7,675,909 B2 | 3/2010 | Ryan et al. | |
| 7,760,732 B2 | 7/2010 | Bhargava et al. | |
| 8,149,839 B1* | 4/2012 | Hsu et al. | 370/392 |
| 2002/0009081 A1* | 1/2002 | Sampath et al. | 370/389 |
| 2002/0159468 A1 | 10/2002 | Foster et al. | |
| 2005/0094649 A1 | 5/2005 | Varanasi et al. | |
| 2005/0254490 A1 | 11/2005 | Gallatin et al. | |
| 2006/0114902 A1* | 6/2006 | Kalkunte et al. | 370/389 |
| 2008/0074996 A1 | 3/2008 | Fourcand | |
| 2010/0149980 A1* | 6/2010 | Cheung et al. | 370/235 |
| 2010/0265821 A1 | 10/2010 | Schmidt et al. | |
| 2011/0075555 A1* | 3/2011 | Ziegler | 370/229 |

OTHER PUBLICATIONS

International Search Report and Written Opinion, Apr. 6, 2012, PCT Application No. PCT/US2011/046948.

Overview of IP Multicast, CISCO [online], Retrieved from the Internet <URL: http://www.cisco.com/en/US/tech/tk828/technologies_white_paper09186a0080092942.shtml> [retrieved on Aug. 3, 2011].

* cited by examiner

FABRIC CHIP HAVING TRUNKED LINKS

CROSS REFERENCE TO RELATED APPLICATION

This application is a U.S. National Stage Application of and claims priority to International Patent Application No. PCT/US2011/046948, filed on Aug. 8, 2011, and entitled "FABRIC CHIP HAVING TRUNKED LINKS".

BACKGROUND

Computer performance has increased and continues to increase at a very fast rate. Along with the increased computer performance, the bandwidth capabilities of the networks that connect the computers together have and continues to also increase significantly. Ethernet-based technology is an example of a type of network that has been modified and improved to provide sufficient bandwidth to the networked computers. Ethernet-based technologies typically employ network switches, which are hardware-based devices that control the flow of packets based upon destination address information contained in the packets. In a switched fabric, network switches connect with each other through a fabric, which allows for the building of network switches with scalable port densities. The fabric typically receives packets from the network switches and forwards the packets to other connected network switches.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
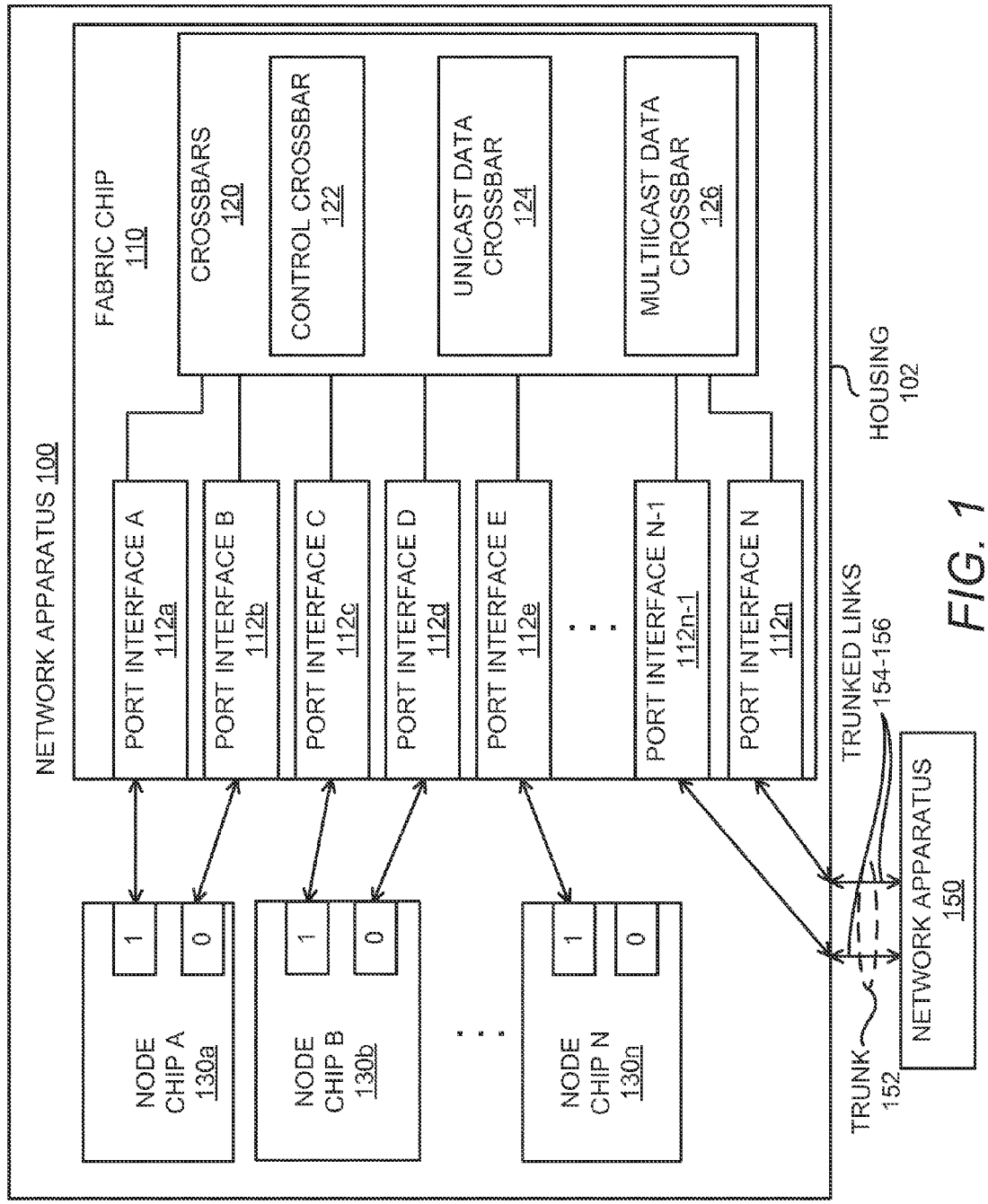
FIG. 1 illustrates a simplified schematic diagram of a network apparatus, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the term "n" following a reference numeral is intended to denote an integer value that is greater than 1. In addition, ellipses (". . . ") in the figures are intended to denote that additional elements may be included between the elements surrounding the ellipses. Moreover, the terms "a" and "an" are intended to denote at least one of a particular element. As used herein, the term "includes" means includes but not limited to, the term "including" means including but not limited to. The term "based on" means based at least in part on.

Disclosed herein are a fabric chip, a switch fabric, and a method for implementing a switch fabric. The fabric chip(s) disclosed herein contains a plurality of port interfaces, in which each of the port interfaces is able to determine which of the other port interfaces are to receive a packet to reach a destination node chip, which may be attached to one of the local port interfaces or to another fabric chip. In addition, the port interfaces are able to make these determinations independently of software external to the port interfaces. According to an example, at least two of the port interfaces in the fabric chip are to be connected to at least two port interfaces of another fabric chip as trunked links of a trunk. Each of the port interfaces includes a resource that keeps track of the port interfaces that are connected to the trunked links of the trunk. In addition, the port interfaces include logic to enable the port interfaces to determine which of the other port interfaces are to receive packets for the packets to reach their intended destinations over switch fabric. The determination of the port interfaces may be made to achieve various predefined objectives.

Trunked links between network switches or fabric chips in a switch fabric may be defined as two or more fabric links that join the same pair of network switches or fabric chips in the switch fabric. In other words, trunked links comprise parallel links. In addition, a trunk may be defined as the collection of trunked links between the same pair of network switches or fabric chips. Thus, for instance, a first trunk of trunked links may be provided between a first network switch and a second network switch, and a second trunk of trunked links may be provided between the first network switch and a third network switch. Packets may be communicated between the network switches over any of the trunked links joining the network switches. Conventional switched fabrics that employ trunked links typically transmit multi-cast packets across multiple ones of the trunked links based upon identifications of the trunked links to be used for the transmission, which are hard-coded into the multi-cast packets. Conventional use of the trunked links in switched fabrics has led to unnecessary use of trunk link bandwidth and is therefore relatively inefficient.

Through implementation of the fabric chip, switch fabric, and method disclosed herein, use of trunked links between fabric chips may be controlled to achieve predefined objectives. In one regard, the amount of traffic communicated across the trunked links may substantially be balanced. In another regard, the fabric chip, switch fabric, and method disclosed herein re-bundles separated multi-cast traffic for transmission across a single trunk link instead of separate bundles of transmission across separate trunk links within the same trunk. In a further regard, the fabric chip, switch fabric, and method disclosed herein enables for a fail-over configuration that causes the other trunk links in a trunk to have higher priority than other links in the event of a fail-over of one of the trunk links in the trunk.

As used herein, packets may comprise data packets and/or control packets. According to an example, packets comprise data and control mini-packets (MPackets), in which control mpackets are Requests or Replies and data mpackets are Unicast and/or Multicast.

With reference first to FIG. 1, there is shown a simplified diagram of a network apparatus 100, according to an example. It should be readily apparent that the diagram depicted in FIG. 1 represents a generalized illustration and that other components may be added or existing components may be removed, modified or rearranged without departing from a scope of the network apparatus 100.

The network apparatus 100 generally comprises an apparatus for performing networking functions, such as, a network switch, or equivalent apparatus. In this regard, the network apparatus 100 may comprise a housing or enclosure 102 and may be configured for use as a networking component. In other words, for instance, the housing 102 may be configured for placement in an electronics rack or other networking environment, such as in a stacked configuration with other network apparatuses. In other examples, the network apparatus 100 may be inside of a larger ASIC or group of ASICs within a housing. In addition, or alternatively, the network apparatus 100 may provide a part of a fabric network inside of a single housing.

The network apparatus 100 is depicted as including a fabric chip 110 and a plurality of node chips 130a-130n having ports labeled "0" and "1". The fabric chip 110 is also depicted as including a plurality of port interfaces 112a-112n, which are communicatively coupled to respective ones of the ports "0" and "1" of the node chips 130a-130n. The port interfaces 112a-112n are also communicatively connected to a crossbar array 120, which are depicted as including a control crossbar 122, a unicast data crossbar 124, and a multicast data crossbar 126. The port interfaces 112n–1 and 112n are also depicted as being connected to another network apparatus 150, which may include the same or similar configuration as the network apparatus 100. Thus, for instance, the another network apparatus 150 may include a plurality of node chips 130a-130n communicatively coupled to a fabric chip 110. As shown, the port interfaces 112n–1 and 112n are connected to the another network apparatus 150 through two trunked links 154, 156, which are part of the same trunk 152. As discussed in greater detail herein below, the communication of packets across the trunked links 154, 156 may be controlled in any of a variety of different predefined manners.

According to an example, the node chips 130a-130n comprise application specific integrated circuits (ASICs) that enable user-ports and the fabric chip 110 to interface each other. Although not shown, each of the node chips 130a-130n may also include a user-port through which data, such as, packets, may be inputted to and/or outputted from the node chips 130a-130n. In addition, each of the port interfaces 112a-112n may include a port through which a connection between a port in the node chip 130a and the port interface 112a may be established. The connections between the ports of the node chip 130a and the ports of the port interfaces 112a-112n may comprise any suitable connection to enable relatively high speed communication of data, such as, optical fibers or equivalents thereof.

According to an example, the fabric chip 110 comprises an ASIC that communicatively connects the node chips 130a-130n to each other. The fabric chip 110 may also comprise an ASIC that communicatively connects the fabric chip 110 to the fabric chip 110 of another network apparatus 150, in which, such connected fabric chips 110 may be construed as back-plane stackable fabric chips. The ports of the port interfaces 112a-112n that are communicatively coupled to the ports of the node chips 130a-130n are described herein as "down-link ports". In addition, the ports of the port interfaces 112a-112n that are communicatively coupled to the port interfaces 112a-112n of the fabric chip 110 in another network apparatus 150 are described herein as "up-link ports". In this regard, trunk links 154, 156 comprise "up-links".

According to an example, packets enter the fabric chip 110 through a down-link port of a source node chip, which may comprise the same node chip as the destination node chip. The destination node chip may be any fabric chip port in the switch fabric, including the one to which the source node chip is attached. In addition, the packets include an identification of which node chip(s), such as a data-list, a destination node mask, etc., to which the packets are to be delivered by the fabric chip 110. In addition, each of the port interfaces 112a-112n is assigned a bit and each of the port interfaces 112a-112n is to implement a port resolution operation to determine which of the port interfaces 112a-112n is to receive the packets. More particularly, for instance, the port interfaces 112a through which the packet was received may apply a bit-mask to the identification of node chip(s) contained in the packet to determine the bit(s) identified in the data and to determine which of the port interface(s) 112b-112n correspond to the determined bit(s). In instances where the packet comprises a uni-cast packet, the port interface 112a may transfer the data over the appropriate crossbar 122-126 to the determined port interface(s) 112b-112n. However, when the packet comprises a multi-cast packet, the port interface 112a may perform additional operations during the port resolution operation to determine which of the port interfaces 112b-112n is/are to receive the multi-cast packet as discussed in greater detail herein below.

Figure 2:
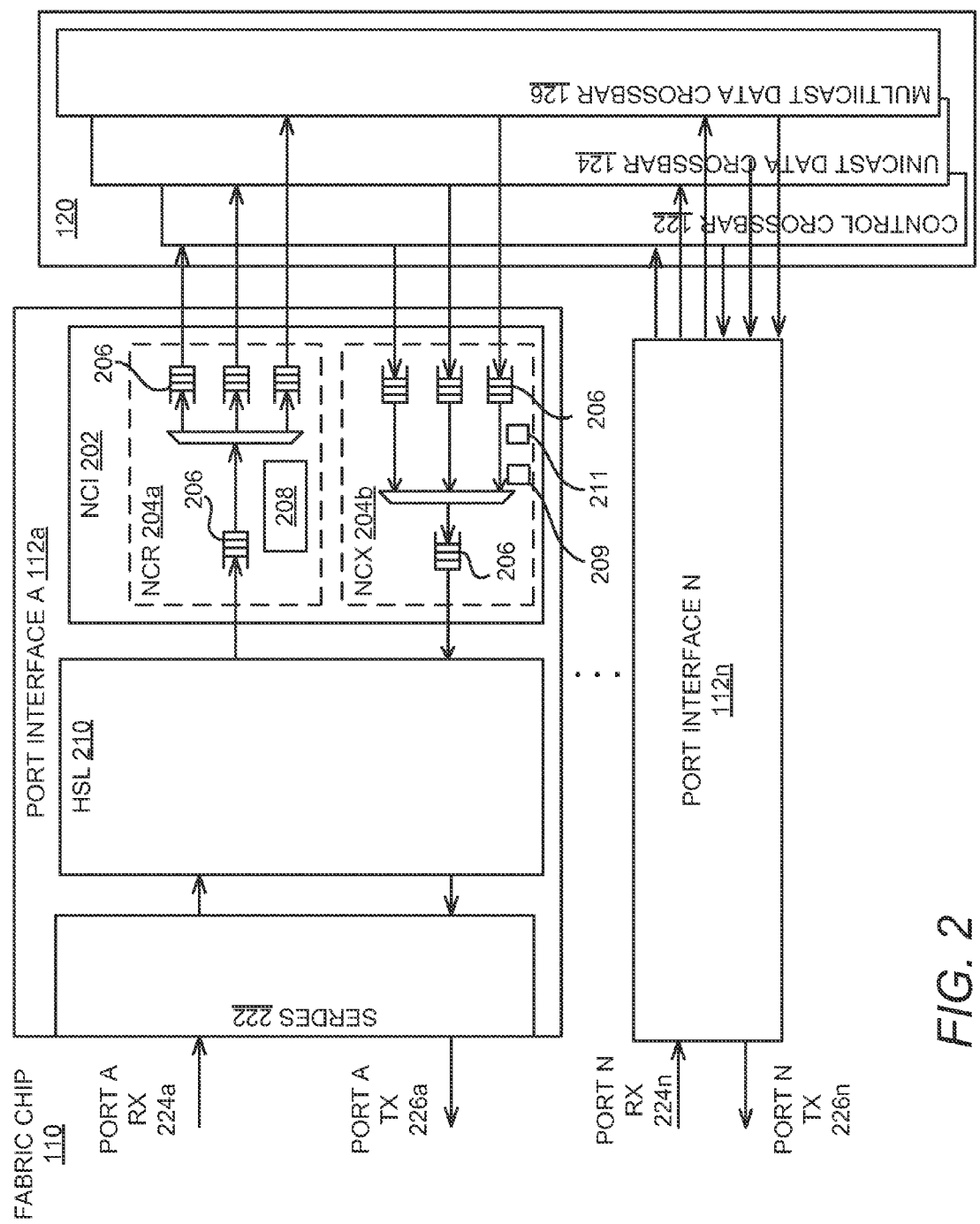
FIG. 2 shows a simplified block diagram of the fabric chip depicted in FIG. 1, according to an example of the present disclosure.

With particular reference now to FIG. 2, there is shown a simplified block diagram of the fabric chip 110 depicted in FIG. 1, according to an example. It should be apparent that the fabric chip 110 depicted in FIG. 2 represents a generalized illustration and that other components may be added or existing components may be removed, modified or rearranged without departing from a scope of the fabric chip 110.

The fabric chip 110 is depicted as including the plurality of port interfaces 112a-112n, the crossbar array 120, and a miscellaneous logic block (MISC) 230. The components of a particular port interface 112a are depicted in detail herein, but it should be understood that the remaining port interfaces 112b-112n may include similar components and configurations.

As shown in FIG. 2, the fabric chip 110 includes a network chip interface (NCI) block 202, a high-speed link (HSL) (interface) block 210, and a set of serializers/deserializers (serdes) 222. By way of particular example, the set of serdes 222 includes a set of serdes modules. In addition, the serdes 222 is depicted as interfacing a receive port 224a and a transmit port 226a. Alternatively, however, components other than the HSL block 210 and the serdes 222 may be employed in the fabric chip 110 without departing from a scope of the fabric chip 110 disclosed herein. Each of the serdes of the remaining port interfaces 112b-112n may include a respective set of receive ports 224b-224n and transmits ports 226b-226n.

The NCI block 202 is depicted as including a network chip receiver (NCR) block 204a and a network chip transmitter (NCX) block 204b. The NCR block 204a feeds data received from the HSL block 210 to the crossbar array 120 and the NCX block 204b transfers data received from the crossbar array 120 to the HSL block 210. The NCR block 204a and the NCX block 204b are further depicted as comprising registers 206, in which some of the registers are communicatively coupled to one of the crossbars 122-126 and others of the registers 206 are communicatively coupled to the HSL block 210.

The NCI block 202 generally transfers data and control mini-packets (MPackets) in full duplex fashion between the corresponding HSL block 210 and the crossbar array 120. In addition, the NCI 202 provides buffering in both directions. The NCI block 202 also includes a port resolution module 208 that interprets destination and path information contained in each received MPacket. By way of example, each received MPacket may include a destination-node-chip-mask that the port resolution module 208 may use in performing a port resolution operation to determine the correct destination NCI block 202 in a different port interface 112b-112n of the fabric chip 110, to make the next hop to the correct destination node chip 130a-130n, which may be attached to a down-link port or an up-link port of the fabric chip 110. In this regard, the port resolution module 208 may be programmed with a resource, bit-mask in which each bit corresponds to one of the port interfaces 112a-112n of the fabric chip 110. In addition, during the port resolution operation, the port resolution module 208 may implement the bit-mask on the fabric-port-mask to determine which bits, and thus, which port interfaces 112b-112n, are to receive the packet. In addition, the port resolution module 208 interprets the destination and path information, determines the correct NCI block 202, and determines the ports to which the packet is to be outputted independently of external software. In other words, the port resolution module 208 need not be controlled by external software to perform these functions.

The port resolution module 208 may also be programmed with information that identifies which of the port interfaces 112a-112n comprise up-links that are trunked links 154, 156. As discussed in greater detail herein below, the port resolution module 208 may perform various transformations on the port interfaces 112a-112n determined to receive the packets when, for instance, the packet comprises a multi-cast packet to be communicated over a trunked link 154, 156.

The NCX block 204b also includes a node pruning module 209 and a unicast conversion module 2011 that operates on packets received from the multicast data crossbar 126. More particularly, the unicast conversion module 211 is to process the packets to identify a data word in the data that the node-chip on the down-link will need for that packet. In addition, the node pruning module 209 is to prune a destination node chip mask to a subset of the bits that represent which node chips are to receive a packet such that only destination node chips 130a-130n that were supposed to traverse the port are still included in the chip mask. Thus, for instance, if the NCX block 204b receives a multi-cast packet listing a chip node 130a of the fabric chip 110 and a chip node 130 attached to another network apparatus 150, the NCX block 204b may prune the data-list of the multi-cast packet to remove the chip node 130a of the fabric chip 110 prior to the multi-cast packet being sent out to the another apparatus 150.

The HSL block 210 generally operates to initialize and detect errors on the hi-speed links, and, if necessary, to re-transmit data. According to an example, the data path between the NCI block 202 and the HSL block 210 is 64 bits wide in each direction.

Figure 3:
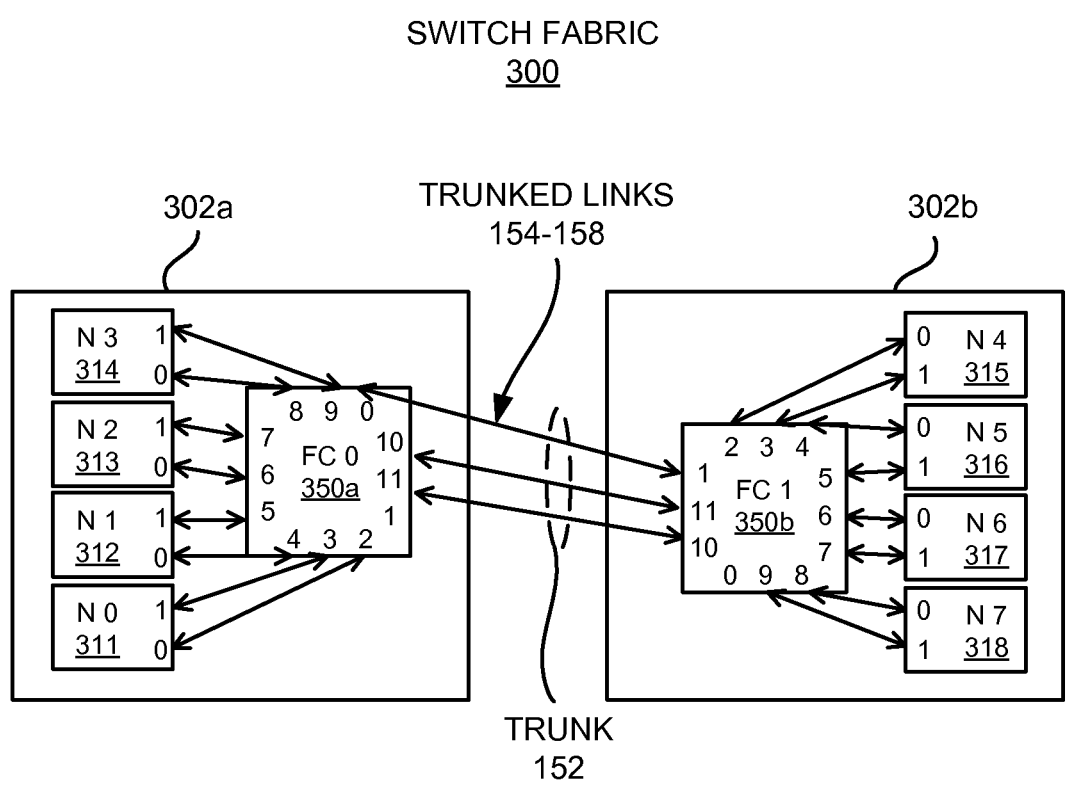
FIGS. 3 and 4, respectively, show simplified block diagrams of switch fabrics, according to two examples of the present disclosure.
Figure 4:
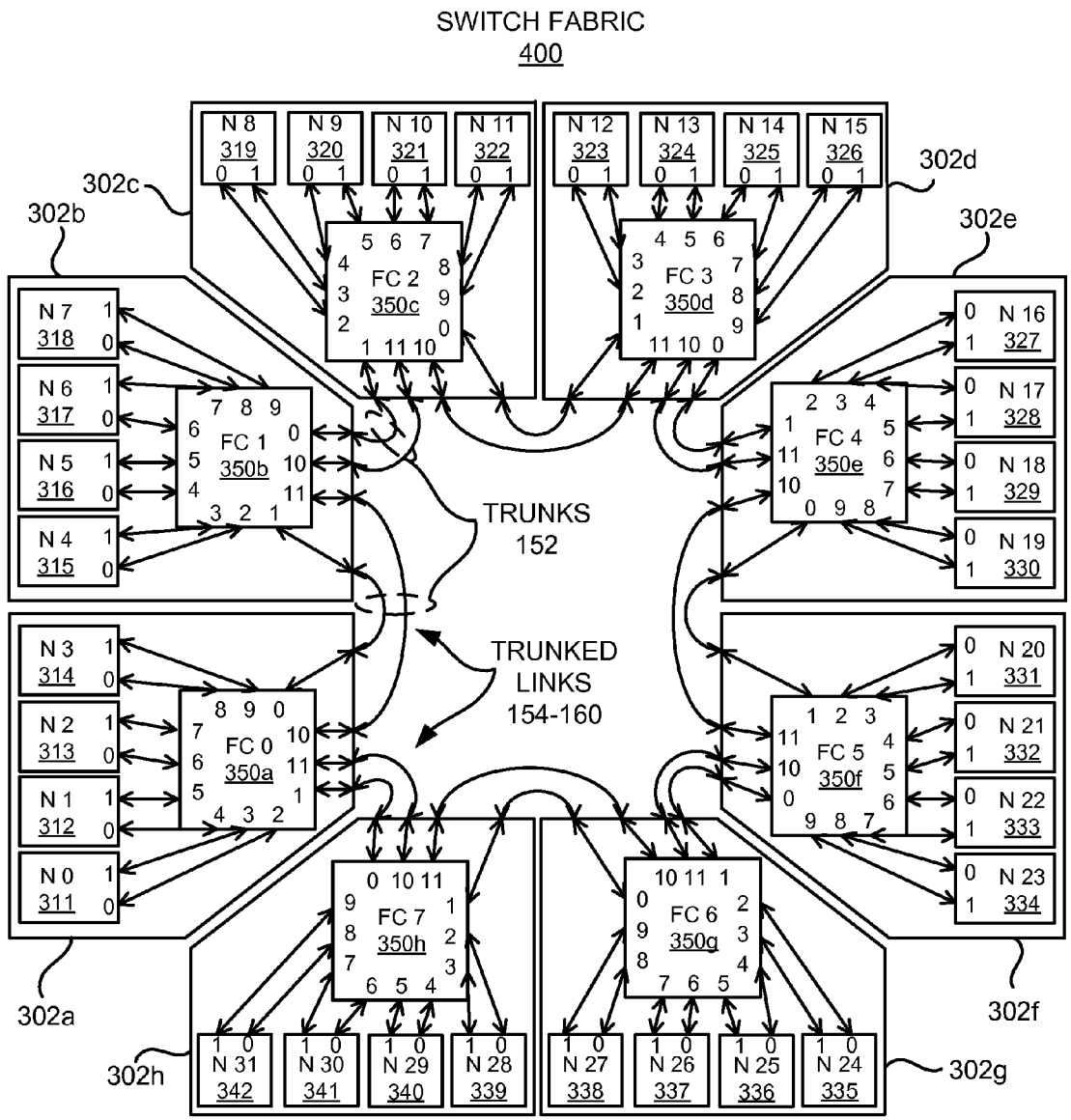

Turning now to FIGS. 3 and 4, there are respectively shown simplified block diagrams of switch fabrics 300 and 400, according to two examples. It should be apparent that the switch fabrics 300 and 400 depicted in FIGS. 3 and 4 represent generalized illustrations and that other components may be added or existing components may be removed, modified or rearranged without departing from the scopes of the switch fabrics 300 and 400.

The switch fabric 300 is depicted as including two network apparatuses 302a and 302b and the switch fabric 400 is depicted as including a plurality of network apparatuses 302a-302h. Each of the network apparatuses 302a-302h is also depicted as including a respective fabric chip (FC0-FC7) 350a-350h. Each of the network apparatuses 302a-302h may comprise the same or similar configuration as the network apparatus 100 depicted in FIG. 1. In addition, each of the fabric chips 350a-350h may comprise the same or similar configuration as the fabric chip 110 depicted in FIG. 2. Moreover, although particular numbers of network apparatuses 302a-302h have been depicted in FIGS. 3 and 4, it should be understood that the switch fabrics 300 and 400 may include any number of network apparatuses 302a-302h arranged in any number of different configurations with respect to each other without departing from scopes of the switch fabrics 300 and 400.

In any regard, as shown in the switch fabrics 300 and 400, the network apparatuses 302a-302h are each depicted as including four node chips (N0-N31) 311-342. Each of the node chips (N0-N31) 311-342 is depicted as including two ports (0, 1), which are communicatively coupled to a port (0-11) of at least one respective fabric chip 350a-350h. More particularly, each of the ports of the node chips 311-342 is depicted as being connected to one of twelve ports 0-11, in which each of the ports 0-11 is communicatively coupled to a port interface 112a-112n. In addition, the node chips 311-342 are depicted as being connected to respective fabric chips 350a-350h through bi-directional links. In this regard, data may flow in either direction between the node chips 311-342 and their respective fabric chips 350a-350h.

As discussed above with respect to FIG. 1, the ports of the fabric chips 350a-350h that are connected to the node chips 311-342 are termed "down-link ports" and the ports of the fabric chips 350a-350h that are connected to other fabric chips 350a-350h are termed "up-link ports". Each of the up-link ports and the down-link ports of the fabric chips 350a-350h includes an identification of destination the node chips 311-342 that should be reached through that link. In addition, the data supplied into the switch fabrics 300 and 400 includes with it an identification of the node chip(s) 311-342 to which the packet is to be delivered. The up-link ports whose identification of node chips 311-342 matches one or more node chips in the identification of the node chip(s), or chip mask, is considered to be a "preferred up-link port", which will receive the data to be transmitted, unless the "preferred up-link port" is dead or is otherwise unavailable. If a preferred up-link is dead or otherwise unavailable, then the port resolution module 208 may use a programmable, prioritized list of ports to be used as alternative up-link ports to select an alternate up-link port to receive the packet instead of the preferred up-link port.

The down-link ports whose list of a single node chip 311-342 matches one of the node chips in the identification of the node chip(s) are considered to be the "active down-link ports". A "path index" is embedded in the packet, which selects which of the "active down-link ports" will be used for the packet. This path-based filtering enables a fabric chip 350a-350h to have multiple connections to a node chip 311-342.

In any regard, the fabric chips 350a-350h are to deliver the packet to the node chips 311-342 that are in identification of the node chip(s). For those node chips 311-342 contained in the identification of the node chip(s) that are connected to down-link ports of a fabric chip 350a, the fabric chip 350a may deliver the packet directly to those node chips 311-314. However, for the node chips 315-342 in the identification of the node chip(s) that are not connected to down-link ports of the fabric chip 350a, the fabric chip 350a performs hardware calculations to determine which up-link port(s) the packet will traverse in order to reach those node chips 315-342. These hardware calculations are defined as "port resolution operations".

As shown in FIG. 3, the fabric chip 350a of the network apparatus 302a is depicted as being communicatively connected to the fabric chip 350b of the network apparatus 302b through three trunked links 154-158, which are part of the same trunk 152. In FIG. 4, each of the fabric chips 350a-350h is depicted as being connected to two neighboring fabric chips 350a-350h through two respective trunked links 154-156 and 158-160, which are part of two separate trunks 152.

The switch fabric 400 depicted in FIG. 4 comprises a ring network configuration, in which each of the fabric chips 350a-350h is connected to exactly two other fabric chips 350a-350h. More particularly, ports (0) and (1) and (10) and (11) of adjacent fabric chips 350a-350h are depicted as being communicatively connected to each other. As such, a single continuous pathway for data signals to flow through each node is provided between the network apparatuses 302a-302h.

Although the switch fabric 300 has been depicted as including two network apparatuses 302a, 302b and the switch fabric 400 has been depicted as including eight network apparatuses 302a-302h, with each of the network apparatuses 302a-302h including four node chips 311-342, it should be clearly understood that the switch fabrics 300 and 400 may include any reasonable number of network apparatuses 302a-302h with any reasonable number of trunked links 154-160 between them without departing from the scopes of the switch fabrics 300 and 400. In addition, the network apparatuses 302a-302h may each include any reasonably suitable number of node chips 311-342 without departing from the scopes of the switch fabrics 300 and 400. Furthermore, each of the fabric chips 350a-350h may include any reasonably suitable number of port interfaces 112a-112n and ports. Still further, the network apparatuses 302a-302h may be arranged in other network configurations, such as, a mesh arrangement, so long as at least two of the network apparatuses 302a-302h comprises trunked links 154-160 with respect to each other.

Figure 5:
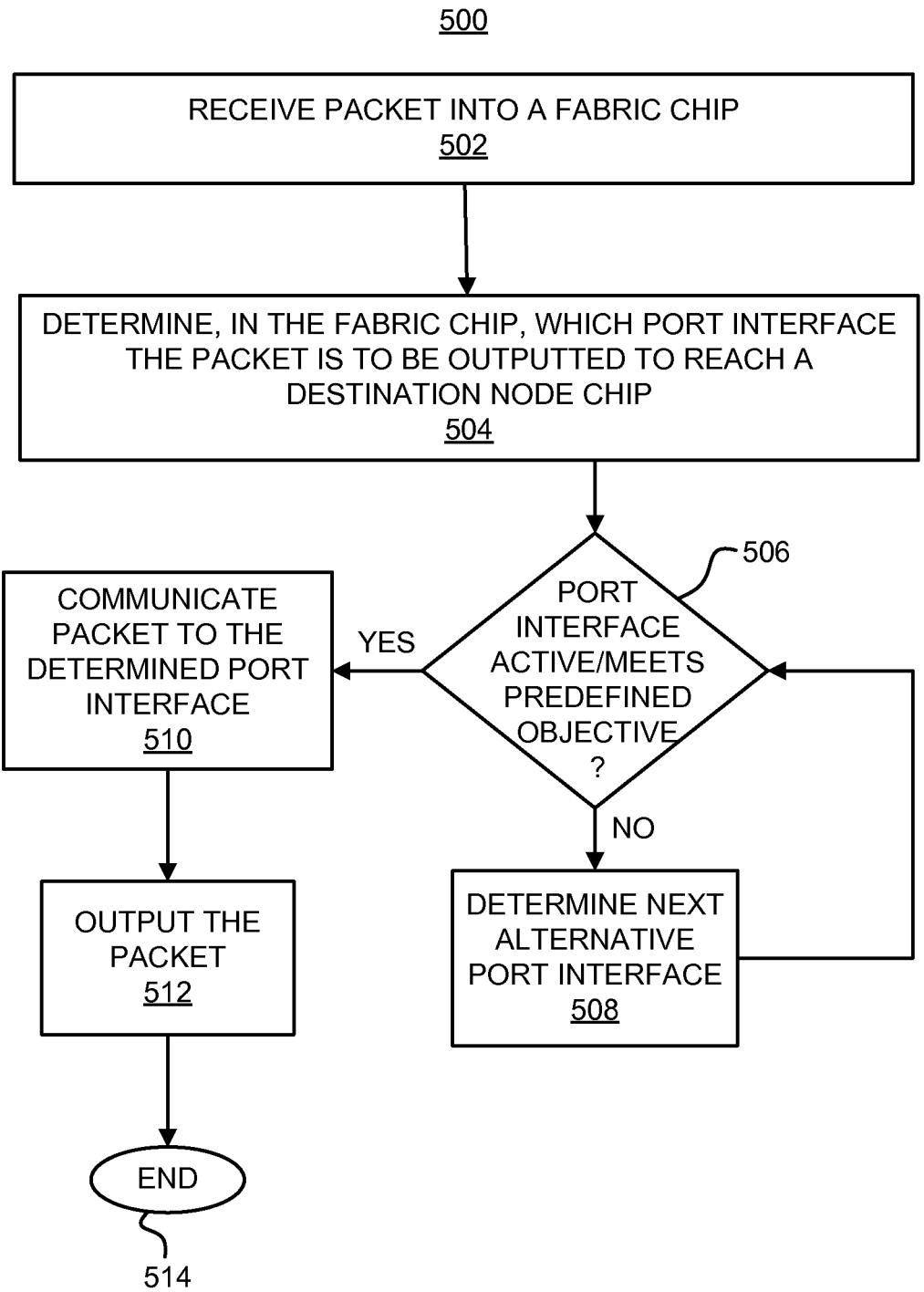
FIGS. 5 and 6, respectively, show flow diagrams of methods for implementing a switch fabric comprising a fabric chip of FIGS. 1-4, according to an example of the present disclosure.
Figure 6:
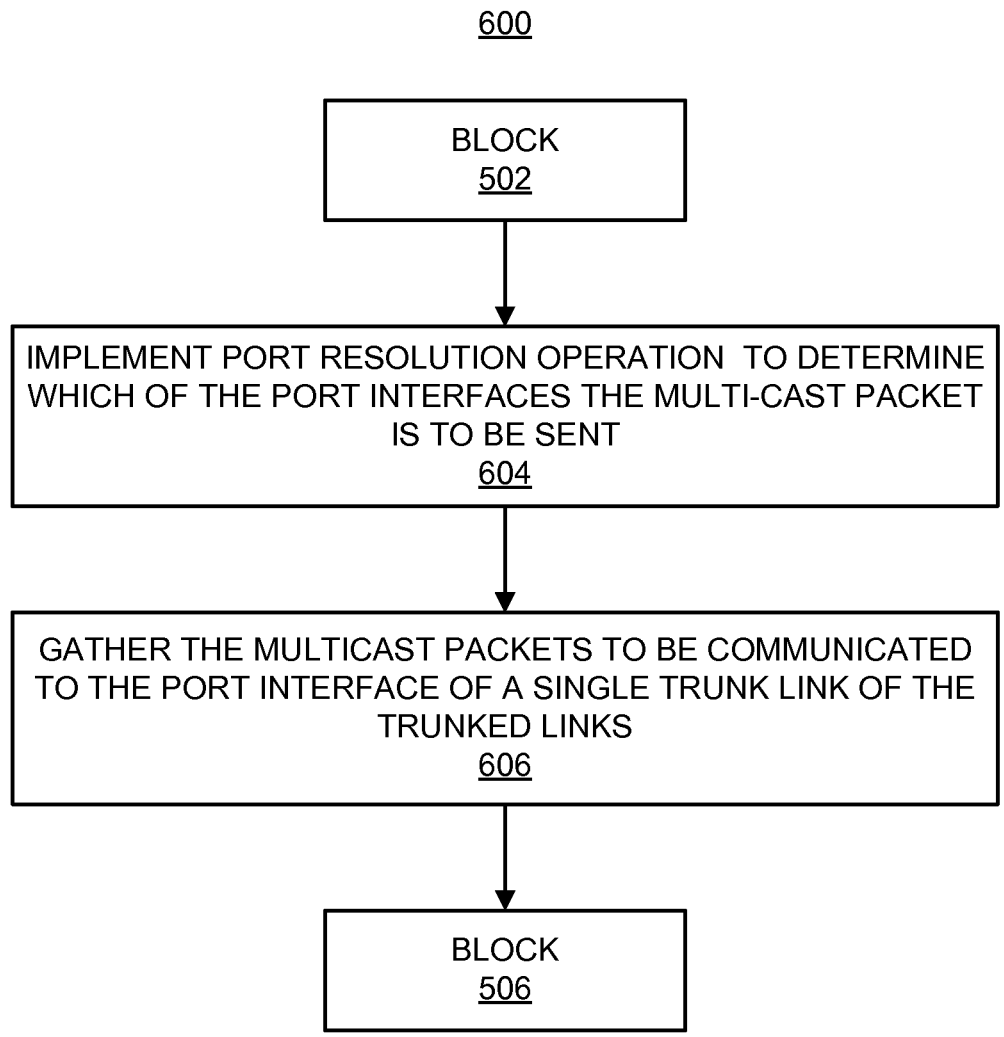

Various manners in which the switch fabrics 300 and 400 may be implemented are described in greater detail with respect to FIGS. 5 and 6, which, respectively depict flow diagrams of methods 500 and 600 for implementing a switch fabric comprising a fabric chip 110, 350a of FIGS. 1-4, according to an example. It should be apparent that the methods 500 and 600 represent generalized illustrations and that other steps may be added or existing steps may be removed, modified or rearranged without departing from the scopes of the methods 500 and 600.

The descriptions of the methods 500 and 600 are made with particular reference to the fabric chips 110 and 350a-350h depicted in FIGS. 1-4. It should, however, be understood that the methods 500 and 600 may be implemented in fabric chip(s) that differ from the fabric chips 110 and 350a without departing from the scopes of the methods 500 and 600. In addition, although reference is made to particular ones of the network apparatuses 302a-302h, and therefore particular ones of the fabric chips 350a-350h and the node chips 311-342, it should be understood that the operations described herein may be performed by and in any of the network apparatuses 302a-302h.

Each of the port interfaces 112a-112n of the fabric chips 110, 350a-350h may be programmed with the destination node chips 130a-130n, 311-342 that are to be reached through the respective port interfaces 112a-112n. Thus, for instance, the port interface 112a containing the port (2) of the fabric chip (FC0) 350a may be programmed with the node chip (N0) 311 as a reachable destination node chip for that port interface 112a. As another example, the port interface 112n containing the port (0) of the fabric chip (FC0) 350a may be programmed with the node chips (N4-N31) 315-342 or a subset of these node chips as the reachable destination node chips for that port interface 112n.

Each of the port interfaces 112a-112n of the fabric chips 110, 350a-350h may be programmed with identifications of which fabric links comprise trunked links. In addition, each of the port interfaces 112a-112n of the fabric chips 110, 350a-350h may be programmed with identifications of which trunked links are grouped together. Thus, for instance, the port interfaces 112a-112On of the fabric chip 350a may be programmed with information that the trunked links 152 and 154 are in a first trunk and that the trunked links 156 and 158 are in a second trunk.

Generally speaking, the method 500 depicted in FIG. 5 pertains to various operations performed by a fabric chip 350a-350h in response to receipt of a uni-cast or a multi-cast packet. In addition, the method 600 depicted in FIG. 6 pertains to various operations performed by a fabric chip 350a-350h in response to receipt of a multicast packet. In both methods 500 and 600, the packet may include various information, such as, an identification of the node chip(s) to which the packet is to be delivered, which is referred to herein as the "data-list", a fabric-port-mask, a destination-chip-node-mask, a bit mask, a chip mask, etc. A "path index" may also be embedded in the packet, which selects which of a plurality of active down-link ports are to be used to deliver the packet to the destination node chip(s) contained in the identification.

With reference first to FIG. 5, at block 502, a packet is received into a fabric chip 350a. The fabric chip 350a may receive the packet through a down-link port from one of the attached node chips 311-314 or through an up-link port (trunk link 154-160) from another fabric chip 350b, 350h. In either event, and as depicted in FIG. 2, the packet may be received through the receipt port 224a, into the serdes 222, the DIB 220, the HSL 210, and into a register 206 of the NCR 204a.

At block 504, a determination, in the fabric chip 350a, of which port interface 112b-112n of the fabric chip 350a the packet is to be outputted to reach a destination node chip(s) listed in the data-list is made, for instance, by the port resolution module 208 of the port interface 112a. In instances where the destination node chip(s) is connected to a down-link port of the fabric chip 350a, the port resolution module 208 may identify the port interface 112b-112n containing the down-link port(s) to the destination node chip(s) from the programmed identification of node chips that are reachable through the port interfaces 112a-112n of the fabric chip 350a at block 504. In the examples depicted in FIGS. 3 and 4, the port resolution module 208 may determine that the packet is to be outputted through one of ports (2)-(9).

In instances where the destination node chip(s) is not connected to a down-link port of fabric chip 350a, the port resolution module 208 may identify the port interface 112b-112n containing the up-link port(s) to another fabric chip 350b-350h that is in direct communication with the destination node chip(s). In the examples depicted in FIGS. 3 and 4, the port resolution module 208 may determine that the packet is to be outputted through one of ports (0), (10), (11) and also port (1) in the example of FIG. 4. In any regard, the port resolution module 208 may determine which of the port interfaces 112b-112n, and thus which of the ports (0)-(11), the packet is to be communicated for the packet to reach the destination node chip(s).

When the packet is to be communicated over a trunked link 154-160, the port resolution module 208 determines which of the trunked links 154-160 the packet is to be communicated. In these instances, the port resolution module 208 is to produce the fabric-port-mask from the content of the packet, which is an indication of which of the port interfaces 112b-112n the packet should be sent through. In addition, the port resolution module 208 includes a bit-mask where each bit of the bit-mask corresponds to one of the port interfaces 112a-112n. The port resolution module 208 implements a port resolution operation on the fabric-port-mask of the packet to determine which of the port interfaces 112a-112n of the trunked links 154-160 is to receive the packet. More particularly, for instance, the packet's data may contain a value that the port resolution module 208 may use as an index into a set of logic that determines which of the trunk links 154-160 to use. In addition, the mapping to a trunk link may be different in each of the fabric chips 350a-350h to assist in shaping traffic for the lowest congestion based on the topology of the switch fabric 300, 400.

By way of example, the port resolution module 208 compares the destination-node-chip-mask to the set of 12, 32 bit bit-masks programmed into the port resolution module 208 since the fabric chip 350a has been depicted as including 12 port interfaces 112a-112n. The 12 resulting bits may be termed "NCX mask 0". If any of those bits are set, the corresponding NCI ports 202 of the port interfaces 112a-112n will be determined to receive the packet.

Turning now to FIG. 6, the method 600 depicts various operations that may be implemented at block 504 when the packet comprises a multi-cast packet.

At block 604, the port resolution module 208 may implement the port resolution operation to determine which of the port interfaces 112b-112n the multi-cast packet is to be sent. That is, for instance, the port resolution module 208 may determine that the fabric-port-mask of the multi-cast packet indicates that the multi-cast packet is to be sent to multiple port interfaces 112b-112n of the same trunk 152.

At block 606, the multi-cast packets determined to be communicated to the port interfaces 112b-112n of the same trunk 152 are gathered to be communicated to a signal single trunk link 154 of the trunk 152, for instance, by the port resolution module 208. That is, for instance, the port resolution module 208 collapses the bits identifying all of the port interfaces 112a-112n associated with the trunked link group that are to receive the multi-cast packet into a single bit corresponding to the port interface of the single trunk link.

By way of example, the multi-cast packets that are destined for a trunk 152 will all have the "NCX mask 0 bits" designation because the trunk 152 gathered to the lowest ordinal number of that trunk 152. The lowest NCI index within the trunk 152 will be determined to receive the multi-cast packets and trunk link rotation may be applied to that port interface 112b-112n. In other words, the port interface 112b-112n connected to the trunk link 154-156 in the trunk 152 having the lowest NCI index may be selected for the multi-cast packet communication to balance the usage of the trunk links 154-156 in the trunk 152.

Following either of blocks 504 and 606, and with reference back to FIG. 5, at block 506, a determination as to whether the determined port interface 112b-112n is active is made, for instance, by the port resolution module 208. In addition, or alternatively at block 506, a determination as to whether the determined port interface 112b-112n at block 504 or 606 meets a predefined objective is made, for instance, by the port resolution module 208. The predefined objective may include, for instance, substantially balancing usage of the port interfaces 112a-112n connected to the trunk links 154-160. By way of example, the port resolution module 208 may track the number of times each of the port interfaces 112a-112n connected to the trunk links 154-160 have been used and may determine that a particular port interface 112b has been used more often than the other port interfaces 112c-112n. In this instance, the port resolution module 208 may determine that the predefined objective has not been met at block 506. As another example, the port resolution modules 208 of the port interfaces 112a-112n may be programmed to cause particular ones of the port interfaces 112a-112n to be used more frequently than other ones of the port interfaces 112a-112

The port resolution module 208 may determine that the determined port interface 112b-112n is dead or is otherwise unavailable based upon, for instance, a prior identification that communication of a packet was not delivered through that port interface 112b-112n. The port resolution module 208 may also make this determination by determining that an attempt to communicate the packet to that port interface 112b-112n has failed.

In response to a determination that the determined port interface 112b-112n is inactive and/or that the predefined objective has not been met at block 506, a next alternative port interface 112b-112n is determined at block 508, for instance, by the port resolution module 208. The port resolution module 208 may determine the next alternative port interface 112b-112n from the prioritized lists of ports to be used as up-link ports to reach the destination chip node(s) 311-342. That is, the port resolution module 208 may select the next port interface 112b-112n in the prioritized list to receive the packet. According to an example, the port interfaces 112b-112n in the same trunked link group as the inactive port interface 112b-112n are listed as having the highest priority in the prioritized list. In addition, the port interfaces 112b-112n that are not in the same trunked link group may be listed as having relatively lower priorities, for instance, based upon the number of hops required by each link. In this regard, the port resolution module 208 may continue to use the same trunk links 154-160 of a particular trunk link group until all of the trunk links 154-160 of that particular trunk link group have been determined to have failed prior to using a different, potentially more bandwidth consuming, path.

According to another example, the alternative port interface 112b-112n may be determined at block 508 by applying a programmable transformation on the port resolution operation, which remaps the desired port interface 112b-112n to a different port interface 112b-112n. By way of example, the programmable transformation may be performed prior to calculation of the alternative port interface in response to the desired port being unavailable. In addition, the alternative port interface may be determined after the programmable transformation has been processed.

In any event, the port resolution module 208 may also determine whether the alternative port interface 112b-112n determined at block 508 is active at block 506, and may determine and select the next port interface 112b-112n in the prioritized list at block 508 in response to a determination that the selected port interface is inactive and/or meets the predefined objective. Blocks 506 and 508 may be repeated until an active port interface 112b-112n and/or a port interface 112b-112n that meets the predefined objective is determined.

At block 510, the packet is communicated to the determined port interface 112b-112n. More particularly, for instance, the NCR 204a of the port interface 112a containing the packet may communicate the packet to the determined port interface 112b-112n through the uni-cast data crossbar 124 or the multi-cast data crossbar 126. In addition, the determined port interface 112b-112n may receive the packet from the unicast data crossbar 124 or the multi-cast data crossbar 126 through the NCX 204b.

At block 512, the determined port interface 112b-112n outputs the packet. In instances where the destination node chip(s) 311-342 is connected to the determined port interface 112b-112n through a down-link port, the packet is delivered directly to the attached node chip(s) 311-342. In instances where the destination node chip(s) 311-342 is not directly connected to the determined port interface 112b-112n, the packet is delivered to another fabric chip 350b-350h through a link or a trunked link 154-160.

At block 514, the method 500 may end for the fabric chip 350a. In addition, the fabric chip(s) 350b-350h that receives the packet from the fabric chip 350a may implement blocks 502-512 as necessary.

In addition, the fabric chip 350b that receives the multi-cast packet from the fabric chip 350a, and/or another fabric chip 350c-350h positioned further downstream from the fabric chip 350b, is to replicate the multi-cast packet for communication to the destination node chips of the multi-cast packet. In this regard, instead of communicating multiple copies of the multi-cast packet over the links between the fabric chips 350a-350h, a single-copy-per-trunk of the multi-cast packet may be communicated over the links and the fabric chips 350a-350h located the farthest away from the source fabric chips 350a-350h may replicate the multi-cast packets. This reduces the amount of bandwidth consumed in the switch fabric 300, 400 in delivering the multi-cast packet to the destination node chips 311-342. Moreover, as the multi-cast packets are delivered to the destination chip nodes, the NCXs 204b in the fabric chips 350a-350c may remove the chip nodes that received the multi-cast packet from the identification of node chip(s) to thereby reduce or eliminate duplicate delivery attempts of the multi-cast packet.

What has been described and illustrated herein are various examples of the present disclosure along with some of their variations. The terms, descriptions and figures used herein are set forth by way of illustration only and are not meant as limitations. Many variations are possible within the spirit and scope of the present disclosure, in which the present disclosure is intended to be defined by the following claims—and their equivalents—in which all terms are mean in their broadest reasonable sense unless otherwise indicated.

What is claimed is:

1. A fabric chip comprising:
   a plurality of port interfaces, wherein each of the plurality of port interfaces includes a network chip interface (NCI) block having a port resolution module;
   a crossbar block communicatively coupled with each of the NCI blocks in the plurality of port interfaces;
   wherein a first port interface of the plurality of port interfaces is to receive a multi-cast packet, wherein the multi-cast packet contains a destination-node-chip mask;
   wherein the port resolution module of the first port interface is to implement a port resolution operation on the destination-node-chip mask to determine that the multi-cast packet is to be communicated through a pair of second port interfaces of the plurality of port interfaces, wherein the pair of second port interfaces are connected to two other port interfaces of another fabric chip as trunked links of a trunk, and wherein the NCI blocks of the pair of second port interfaces include a resource that keeps track of the pair of second port interfaces in the fabric chip that are connected to the trunked links of the trunk; and
   wherein the port resolution module of the first port interface is further to gather the multi-cast packet to be communicated to the pair of second port interfaces by collapsing bits that identify the pair of second port interfaces connected to the trunk links of the trunk into a single bit corresponding to one of the pair of second port interfaces; and
   communicate, from the first port interface, the gathered multi-cast packet to the one of the pair of second port interfaces.

2. The fabric chip according to claim 1, wherein the resource comprises a bit-mask, wherein each bit in the bit-mask corresponds to one of the pair of second port interfaces of the fabric chip.

3. The fabric chip according to claim 1, wherein the port resolution module of the first port interface is further to control usage of the pair of second port interfaces connected to the trunked links of the trunk to meet a predefined objective.

4. The fabric chip according to claim 3, wherein the predefined objective comprises balancing usage of the pair of second port interfaces connected to the trunk links of the trunk.

5. The fabric chip according to claim 1, wherein the port resolution module of the first port interface is further to implement an automatic fabric reroute operation that configures a highest priority fail-over option to be within the pair of second port interfaces connected to the trunked links of the trunk and a lowest priority fail-over option to be outside of the pair of second port interfaces connected to the trunked links of the trunk.

6. A switch fabric comprising:
   a first fabric chip having a plurality of first port interfaces, wherein each of the plurality of first port interfaces includes a port resolution module;
   a source node chip communicatively coupled to a first port interface of the plurality of first port interfaces;
   a destination node chip; and
   a second fabric chip comprising a plurality of second port interfaces, wherein at least two trunked second port interfaces of the second fabric chip are communicatively coupled to at least two trunked first port interfaces of the first fabric chip through trunked links of a trunk,
   wherein the first port interface is to receive a multi-cast packet from the source node chip, wherein the multi-cast packet contains a destination-node-chip mask; and
   wherein the port resolution module of the first port interface is to implement a port resolution operation on the destination-node-chip mask to determine that the multi-cast packet is to be communicated through the at least two trunked first port interfaces of the first fabric chip, to gather the multi-cast packet to be communicated to the at two trunked first port interfaces by collapsing bits that identify the at least two trunked first port interfaces connected to the trunk links of the trunk into a single bit corresponding to one of the at least two trunked first port interfaces, and to communicate, from the first port interface, the gathered multi-cast packet to the one of the at least two trunked first port interfaces.

7. The switch fabric according to claim 6, wherein the second fabric chip is to receive the multi-cast packet through one of the at least two trunked second port interfaces and to replicate the multi-cast packet for communication to recipients of the multi-cast packet.

8. A method for implementing a fabric chip, said method comprising:
   receiving a multi-cast packet into a first port interface of plurality of port interfaces of the fabric chip, wherein the multi-cast packet contains a destination-node-chip mask;
   implementing a port resolution operation on the destination-node-chip mask to determine that the multi-cast packet is to be communicated through a pair of second port interfaces of the plurality of port interfaces, wherein the pair of second port interfaces are connected to trunked links of a trunk to another pair of port interfaces on a second fabric chip;

gathering the multi-cast packet to be communicated to the pair of second port interfaces by collapsing bits that identify the pair of second port interfaces connected to the trunk links of the trunk into a single bit corresponding to one of the pair of second port interfaces; and communicating, from the first port interface, the gathered multi-cast packet to the one of the pair of second port interfaces.

9. The method according to claim 8, wherein implementing the port resolution operation to determine that the multi-cast packet is to be communicated through the pair of second port interfaces further comprises implementing the port resolution operation to control usage of the pair of second port interfaces connected to the trunked links of the trunk to meet a pre-defined objective.

10. The method according to claim 8, wherein implementing the port resolution operation to determine that the multi-cast packet is to be communicated through the pair of second port interfaces further comprises implementing the port resolution operation to implement an automatic fabric reroute operation that configures a highest priority fail-over option to be within the pair of second port interfaces connected to the trunked links of the trunk and a lowest priority fail-over option to be outside of the pair of second port interfaces connected to the trunked links of the trunk.

\* \* \* \* \*